(12) United States Patent
Rotem et al.

(10) Patent No.: US 10,423,202 B2
(45) Date of Patent: Sep. 24, 2019

(54) SYSTEM POWER MANAGEMENT

(71) Applicant: Intel Corporation, Santa Clara, CA (US)

(72) Inventors: Efraim Rotem, Haifa (IL); Tod F. Schiff, Portland, OR (US); Doron Rajwan, Rishon Le-Zion (IL); Jeffrey M. Jull, Hillsboro, OR (US); James G. Hermerding, II, Vancouver, WA (US); Nir Rosenzweig, Givat Ella (IL); Maytal Toledano, Tel Aviv (IL); Alexander B. Uan-Zo-Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 15/093,042

(22) Filed: Apr. 7, 2016

(65) Prior Publication Data

US 2017/0293332 A1    Oct. 12, 2017

(51) Int. Cl.
*G06F 1/26* (2006.01)
*G08B 21/18* (2006.01)
*G06F 1/3212* (2019.01)
*G06F 1/324* (2019.01)
*G08B 25/08* (2006.01)

(52) U.S. Cl.
CPC ............... *G06F 1/26* (2013.01); *G06F 1/324* (2013.01); *G06F 1/3212* (2013.01); *G08B 21/182* (2013.01); *G08B 25/08* (2013.01); *Y02D 10/126* (2018.01); *Y02D 10/174* (2018.01)

(58) Field of Classification Search
CPC ...... G06F 1/3206; G06F 1/324; G06F 1/3296; G06F 1/26; G06F 1/3203; G06F 1/3237; G06F 3/0412; G06F 3/0416
See application file for complete search history.

(56) References Cited

U.S. PATENT DOCUMENTS

| 8,756,442 | B2 | 6/2014 | Naffziger et al. |
| 2004/0268166 | A1* | 12/2004 | Farkas .................... G06F 1/206 713/320 |
| 2013/0111410 | A1* | 5/2013 | Okada ................... G06F 3/0482 715/841 |
| 2013/0124885 | A1 | 5/2013 | Davis et al. |

(Continued)

FOREIGN PATENT DOCUMENTS

KR    10-2013-0011811 A    1/2013

OTHER PUBLICATIONS

International Search Report and Written Opinion issued in PCT Application No. PCT/US2017/016732, dated May 17, 2017, 15 pages.

*Primary Examiner* — Jaweed A Abbaszadeh
*Assistant Examiner* — Alyaa T Mazyad
(74) *Attorney, Agent, or Firm* — Grossman, Tucker, Perreault & Pfleger, PLLC

(57) ABSTRACT

One embodiment provides an apparatus. The apparatus includes power control logic and a critical comparator. The power control logic is to determine a critical threshold (TC) based, at least in part, on an available input power value (Pin). The critical comparator is to compare a system power consumption value (Psys) and the critical threshold and to assert a processor critical throttle signal to a processor if the system power consumption value is greater than or equal to the critical threshold.

19 Claims, 4 Drawing Sheets

(56) References Cited

U.S. PATENT DOCUMENTS

| | | | |
|---|---|---|---|
| 2014/0092106 A1* | 4/2014 | Hurd | G06F 13/14 |
| | | | 345/520 |
| 2014/0380072 A1 | 12/2014 | Lee | |
| 2015/0177811 A1 | 6/2015 | Bose et al. | |
| 2016/0065052 A1* | 3/2016 | Shinozaki | H02M 1/32 |
| | | | 323/282 |
| 2016/0091950 A1* | 3/2016 | Thompson | G06F 1/3206 |
| | | | 713/320 |
| 2016/0179164 A1* | 6/2016 | Park | G06F 1/324 |
| | | | 713/322 |

* cited by examiner

SYSTEM POWER MANAGEMENT

FIELD

The present disclosure relates to power management, in particular to, system power management.

BACKGROUND

Power sources for many electronic devices are sized for worst-case power consumption situations. The worst-case power consumption situations occur intermittently and may occur infrequently. Thus, the power sources may be generally overdesigned resulting in a relatively larger physical size and a relatively higher cost.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
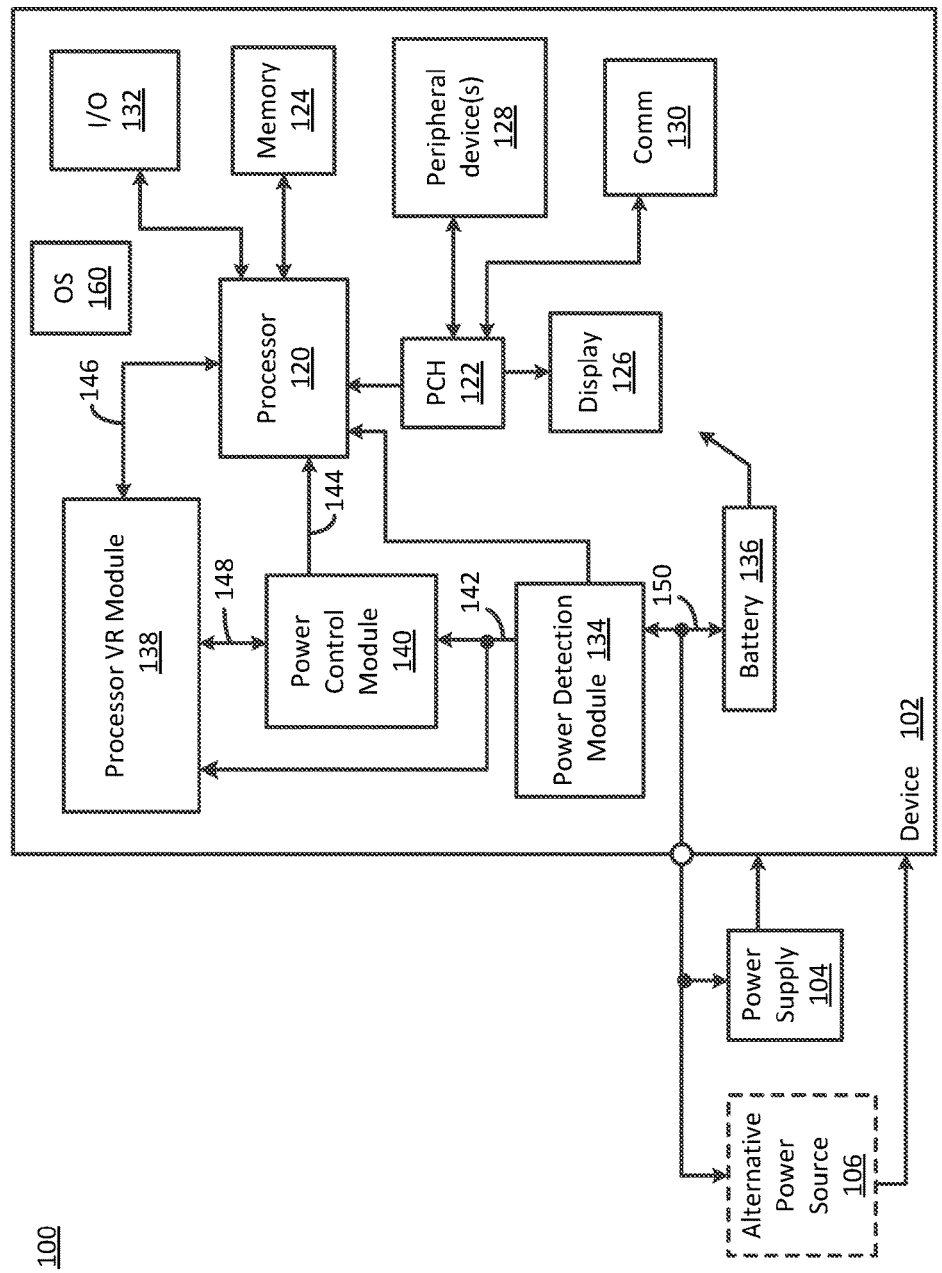
FIG. 1 illustrates a functional block diagram of a power management system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

A device, e.g., an electronic device, may be configured to receive input power from one or more power sources including, but not limited to, a battery, a battery charger, a power supply, a Universal serial bus (USB), wireless input power, etc., and/or combinations thereof. The electronic device may include a number of power consumers including, but not limited to, a processor, a display, a communication interface (e.g., a transceiver), a peripheral device (e.g., hard disk drive, solid-state drive, keypad, touchpad, keyboard, etc.), an input/output interface (e.g., a communication bus), a graphics processor, etc. The system power consumption may vary over time, related to operation (i.e., activities) of each of the power consumers. For example, power consumption by some power consumers, e.g., a wireless transceiver, may be bursty. The activities of one or more of the power consumers may be synchronous or asynchronous, thus, power consumption may fluctuate in a generally unpredictable manner. Thus, periodically and/or intermittently, system power consumption may experience a transient rise and a corresponding transient peak in power consumption followed by a decrease in power consumption.

Generally, this disclosure relates to system power management. An apparatus, method and/or system are configured to capture an available input power value (Pin) and to determine a critical threshold (TC) based, at least in part, on the available input power value. The available input power value represents the available input power to the system at a point in time. The apparatus, method and/or system may be further configured to determine at least one warning threshold based, at least in part, on the critical threshold. The apparatus, method and/or system are further configured to capture a system power consumption value (Psys) that corresponds to (i.e., represents) a total system power consumption at a point in time.

In operation, the critical threshold may be compared to the system power consumption value. If the system power consumption value has increased to and/or is greater than or equal to the critical threshold, the apparatus, method and/or system may then be configured to assert a processor critical throttle signal to a processor. The processor is configured to throttle in response to the asserted processor critical throttle signal. The throttling is configured to decrease processor power consumption relatively quickly. Throttling may include, but is not limited to, exiting Turbo mode, reducing processor clock frequency, reducing processor supply voltage, etc. The apparatus, method and/or system may be configured to implement the throttling within a relatively short, e.g., on the order of 1 μs (microsecond), time interval of detecting the system power consumption value greater than or equal to the critical threshold.

The system power consumption value may be further compared to the at least one warning threshold. If the system power consumption value increases to greater than or equal to the warning threshold, then counting, e.g., clock cycles, clock ticks, clock pulses and/or multiples thereof, by a counter may be initiated. The counter may be configured to continue counting as long as Psys is greater than or equal to the warning threshold. For example, if the system power consumption increases (i.e., transient rising edge) to greater than or equal to a warning threshold, then an associated counter may be configured to count for a duration of a time interval that the system power consumption is greater than or equal to the warning threshold. A number of counts may then be utilized to support learning, as described herein. The learning may then be utilized to determine, among other things, a target processor state for when the system power consumption decreases to less than the critical threshold and the processor exits the throttled state. The target processor state may be configured to reduce the likelihood that increasing the processor power consumption upon exiting the throttled state will increase Psys to greater than the critical threshold and, thus again triggering throttling.

The apparatus, method and/or system may be configured to adjust the critical threshold and the at least one warning threshold based, at least in part, on a change in the available input power value. For example, the available input power may change when a power source is coupled to or decoupled from the system. In another example, the available input power may change based, at least in part, on a level of charge, i.e., available capacity, of a battery.

The apparatus, method and/or system may be configured to adjust the at least one warning threshold based, at least in part, on a history. History, i.e., data captured over a time period related to system power consumption, may include, but is not limited to, an average, maximum and/or minimum number of counts reached by each counter in the time period, identity of one or more power consumers during each time interval that the system power consumption is greater than the warning threshold and/or greater than the critical threshold, one or more critical threshold values and/or one or more warning threshold values, etc. The history may be utilized to determine the target processor state, as described herein.

Thus, a size, i.e., capacity, of one or more power sources may be reduced and transient peak power consumption may be managed. In other words, controlling, e.g., throttling, the processor to decrease the processor power consumption, and thus system power consumption, in response to detecting an increase in system power consumption to greater than or equal to the critical threshold, is configured to reduce the resulting peak system power consumption and to thus avoid a peak system power consumption of sufficient magnitude to cause a failure. The response to detecting the increase in the system power consumption value to greater than or equal to the critical threshold is configured to be relatively fast (e.g., response time on the order of 1 µs). The response to a decrease in the system power consumption value to less than the critical threshold, i.e., recovery, is configured to be relatively fast so that such power management is transparent to a user.

FIG. 1 illustrates a functional block diagram of a power management system 100 consistent with several embodiments of the present disclosure. The power management system 100 includes a device 102 and may include a power supply 104 and/or an alternative power source 106. The power supply 104 and/or alternative power source 106 are configured to supply power to device 102. The power supply 104 and/or alternative power source 106 may be controllably coupled to device 102. In other words, power supply 104 and/or alternative power source 106 may be plugged into or unplugged from device 102. For example, power supply 104 may include a battery charger and/or a power supply. Power supply 104 may be coupled to device 102 and/or may be integral in device 102. Alternative power source 106 may include, but is not limited to, a Universal serial bus (USB)-based power source, wireless input power source (e.g., Qi®), a Thunderbolt™-compatible power source, etc.

Device 102, may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), a phablet, an ultraportable computer, an ultramobile computer, a netbook computer and/or a subnotebook computer; etc.

Device 102 may include a processor 120, a platform controller hub (PCH) 122, memory 124, display 126, one or more peripheral devices 128, a communications interface "Comm" 130 and/or an input/output (I/O) interface 132. Device 102 may further include operating system (OS) 160. For example, OS 160 may be included in memory 124. Processor 120 may be coupled to PCH 122, memory 124 and I/O interface 132. PCH 122 may be coupled to display 126, peripheral devices 128 and/or Comm 130. Elements 120, 122, 124, 126, 128, 130 and 132 may all be power consumers for device 102. Power consumption associated with each element 120, 122, 124, 126, 128, 130 and/or 132 may vary over time based, at least in part, on operation of each element.

Device 102 may include power detection module 134, battery 136 and/or processor voltage regulator (VR) module 138. Device 102 includes power control module 140. For example, power detection module 134 may correspond to an embedded controller. In another example, power detection module 134 may be included in processor 120.

Battery 136 may be configured to supply power to one or more elements 120, 122, 124, 126, 128, 130 and/or 132 included in device 102 and/or may be a power consumer. Battery 136 may be configured to be charged by, e.g., power supply 104. In some situations, device 102 power consumption may exceed the power available from the battery 136 or the power supply 104 alone. In these situations, power may be drawn from both power supply 104 and battery 136. Battery 136 may have an associated maximum capacity and/or an available capacity (i.e., remaining charge) that may be determined by, e.g., power detection module 134.

Power detection module 134 may be coupled to battery 136, power supply 104 and/or alternative power source 106 by a communication link 150. In some embodiments, power detection module 134 may be coupled to battery 136, power supply 104 and/or alternative power source 106 by a serial communication bus. For example, the serial communication bus may comply and/or be compatible with one or more of an I2C bus and/or an SMBus, as described herein.

Each power source 104, 106 and/or battery 136 may have an associated unique power source identifier that may be provided to and/or determined by power detection module 134. Each unique power source identifier may further include a capacity descriptor that corresponds to the capacity (e.g., power in watts (W)) of the associated power source. Power detection module 134 is configured to detect and identify power sources, e.g., power supply 104 and/or one or more alternative power source 106, when they are coupled to device 102. Power detection module 134 is further configured to detect when a power source, e.g., power supply 104 and/or alternative power source 106, becomes disconnected from device 102. Power detection module 134 may similarly detect and identify battery 136 and may also be configured to detect a remaining capacity, e.g., percent charge remaining, of battery 136.

Power detection module 134 may thus be configured to determine an available input power value, Pin, based, at least in part, on one or more of detection of power sources coupled to device 102, identity of coupled power sources, supply power capacities of coupled power sources and/or remaining capacity of battery 136. The available input power value, Pin, corresponds to an amount of available input power. In other words, Pin is configured to represent the amount of input power available to device 102 from the one or more power sources 104, 106 and/or the battery 136.

Power detection module 134 may be further configured to determine a system power consumption value, Psys. The system power consumption value, Psys, corresponds to an amount of power being consumed by device 102. In other words, Psys is configured to represent the amount of power being consumed. For example, system power consumption may correspond to current input power supplied by 104 and/or 106 plus power supplied by battery 136 if the battery 136 is discharging. In another example, system power consumption may correspond to current input power supplied by 104 and/or 106 minus the power being supplied to battery 136 if the battery 136 is charging. For example, power supplied by the battery 136 or power consumed by the battery 136 may be determined by sensing current from or to the battery 136. System power consumption value, Psys, corresponds to a total power consumption of all power consumers included in device 102. In other words, Psys is configured to include a respective power consumption component for each power consuming element of device 102, including processor 120.

Power detection module 134 may be configured to provide a power source identifier, a power source capacity descriptor and a power source status indicator to processor 120 for each power source coupled to device 102. Power detection module 134 may be configured to communicate the available input power value, Pin, and the system power consumption value, Psys, to processor 120, power control module 140 and processor VR module 138. For example, Pin and/or Psys may be communicated as sense signals proportional to the actual available input power and/or the actual system power consumption. In other words, the sense signals may be voltages, currents and/or digital signals representing the voltages and/or currents. The available input power value and system power consumption value may be included in a power status signal 142. The available input power value, Pin, may be communicated intermittently, periodically and/or in response to an event. For example, an event may include a power source being coupled to or decoupled from device 102. The system power consumption value, Psys, may be communicated intermittently, periodically and/or in response to an event. For example, an event may include a change in system power consumption greater than a predefined value.

Processor VR module 138 is configured to receive Pin and Psys from power detection module 134. Processor VR module 138 may be coupled to processor 120 by a serial communication bus 146. Processor VR module 138 is configured to communicate information related to available input power and system power consumption to processor 120 via the serial communication bus 146. For example, serial communication bus 146 may be a proprietary serial communication bus or may comply and/or be compatible with one or more serial communication bus specifications, as described herein. Processor VR module 138 may be configured to provide information to processor 120 at a rate on the order of milliseconds.

Power control module 140 is configured to receive Pin and Psys from power detection module 134. Power control module 140 is configured to provide a processor critical throttle signal 144 directly to processor 120 in response to Psys increasing to greater than or equal to a critical threshold, as described herein. Power control module 140 is further configured to provide a processor alert signal 148 to processor VR module 138 for communication to processor 120 via serial communication bus 146. The processor alert signal 148 may correspond to Psys increasing to greater than or equal to one or more warning thresholds, as described herein. Communication via processor VR module 138 and serial communication bus 146 may be generally slower than direct communication between power control module 140 and processor 120.

Each power source, e.g., power supply 104 and/or alternative power source 106, may be dynamically coupled and/or decoupled to/from device 102. Such coupling and/or decoupling is not controlled by device 102. Power detection module 134 may thus be configured to detect coupling and/or decoupling, to identify coupled power sources, to detect available input power and to detect system power consumption. Power detection module 134 is further configured to communicate an available input power value, Pin, and system power consumption value, Psys, to processor 120, power control module 140 and/or processor VR module 138. Time varying system power consumption may thus be detected and communicated.

Figure 2:
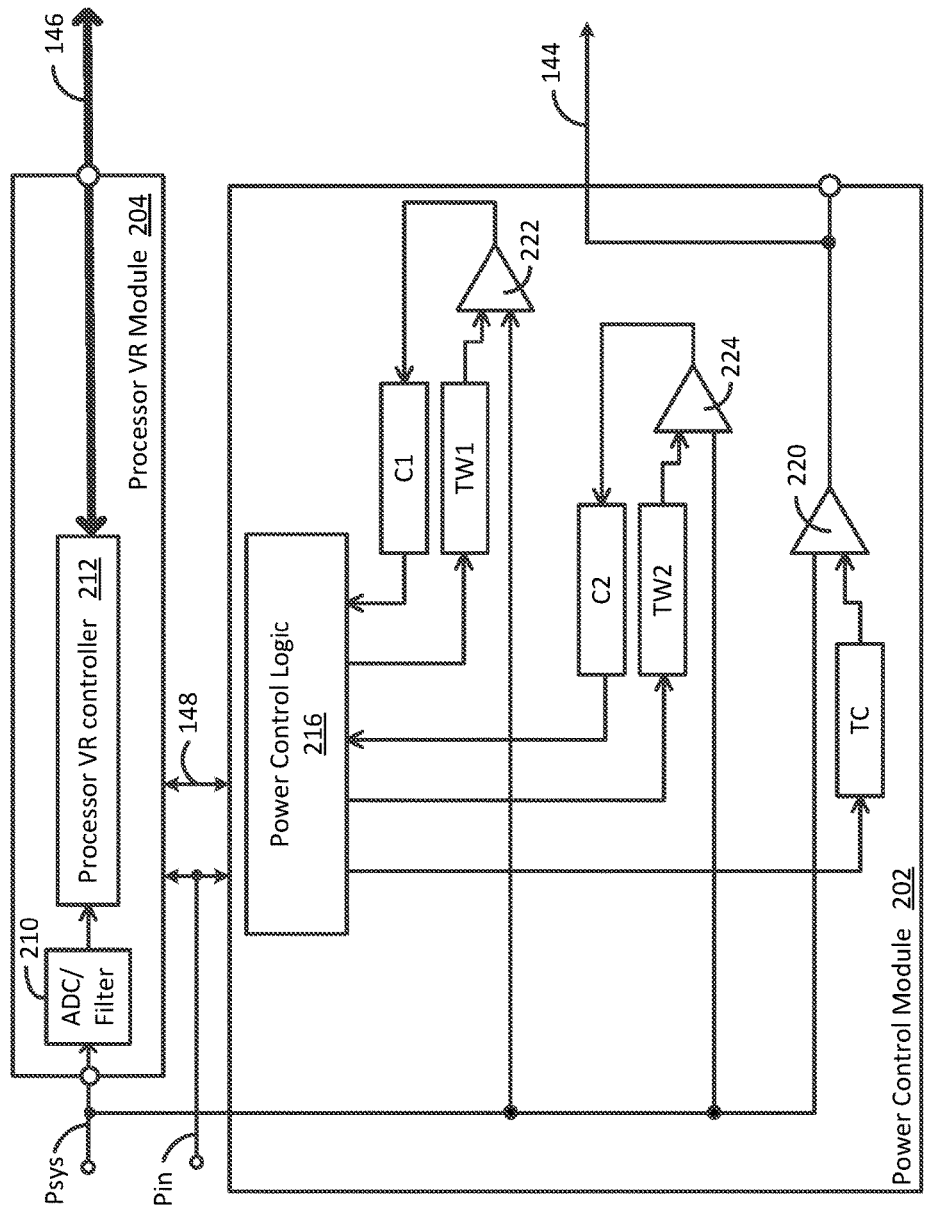
FIG. 2 illustrates a power control module and a processor voltage regulator module consistent with several embodiments of the present disclosure.

FIG. 2 illustrates a power control module 202 and a processor VR module 204 consistent with several embodiments of the present disclosure. Power control module 202 is one example of power control module 140 and processor VR module 204 is one example of processor VR module 138 of FIG. 1.

Processor VR module 204 may include an analog to digital converter (ADC)/filter stage 210 and a processor voltage regulator (VR) controller 212. Processor VR module 204 is configured to manage power supplied to processor 120. Processor VR module 204 is configured to receive system power consumption value, Psys. For example, Psys may be included in, e.g., power status signal 142. ADC/filter stage 220 is configured to filter Psys and to convert the filtered value to a digital representation. The filter 210 may have an associated time constant on the order of milliseconds. Processor VR controller 212 is configured to manage communication with processor 120 via the serial communication bus 146. Processor VR module 204 may be further configured to receive an available input power value, Pin. Thus, processor VR module 204 may be configured to manage power supplied to processor 120 via communication bus 146 with a timing on the order of milliseconds.

Power control module 202 is configured to receive power consumption value, Psys, and available input power value, Pin. Power control module 202 includes power control logic 216, critical comparator 220, first warning comparator 222, second warning comparator 224, first and second counters C1, C2, first and second warning thresholds TW1, TW2 and critical threshold TC. In an example, TW2 may be greater than TW1. For example, thresholds TW1, TW2, TC that are input to respective comparators may correspond to voltage levels. A first input of each comparator 220, 222, 224 is configured to receive system power consumption value, Psys. Psys may be provided to each comparator 220, 222, 224 upstream of ADC/filter 210. In other words, Psys may not be filtered by ADC/filter 210 prior to being provided to the comparators 220, 222, 224. In this manner, relatively rapid changes in Psys, e.g., on the order of 1 μs, may be detectable by at least critical comparator 220.

A second input of critical comparator 220 is coupled to power control logic 216 and is configured to receive critical threshold TC. An output of critical comparator 220 corresponds to processor critical throttle signal 144. The output of critical comparator 220 may thus be coupled to processor 120 of FIG. 1. Thus, if Psys is greater than or equal to TC, then processor critical throttle signal 144 may be asserted and if Psys is less than TC, then processor critical throttle signal 144 may be deasserted (i.e., may not be asserted). Processor critical throttle signal 144 may be active low, i.e., the output of critical comparator 220 may be low when the processor critical throttle signal 144 corresponds to asserted. A time constant associated with critical comparator 220 and processor critical throttle signal 144 may be on the order of 1 μs. Processor 120 may then be configured to throttle in response to an asserted processor critical throttle signal 144. Throttling may include, but is not limited to, reducing a processor clock frequency, reducing a processor supply voltage, exiting a high speed, e.g., turbo, mode. Throttling is configured to reduce power consumption of the processor relatively quickly, i.e., on the order of ones to tens of microseconds.

A second input of first warning comparator 222 is coupled to power control logic 216 and is configured to receive a first warning threshold TW1. An output of first warning comparator 222 is coupled to the first counter C1. An output of the first counter C1 is coupled to power control logic 216. Thus, if Psys increases from less than to greater than or equal to the first warning threshold TW1, then the first counter C1 may be triggered to begin counting. For example, the first counter C1 may be configured to count clock cycles, clock ticks, clock pulses and/or multiples thereof. In other words, the count is configured to correspond to a time duration. The first counter C1 may be configured to continue counting as long as Psys remains greater than or equal to TW1. If Psys decreases to less than TW1, then the first counter C1 may halt counting. In an embodiment, the first counter C1 may be configured to hold the count value until the count is read by, e.g., power control logic 216. In this embodiment, reading the count value may result in the count being reset to, e.g., zero. Thus, the count associated with first counter C1 may be configured to indicate a duration of a time interval that Psys is greater than or equal to TW1.

A second input of second warning comparator 224 is coupled to power control logic 216 and is configured to receive a second warning threshold TW2. An output of second warning comparator 224 is coupled to the second counter C2. An output of the second counter C2 is coupled to power control logic 216. Thus, if Psys increases from less than to greater than or equal to the second warning threshold TW2, then the second counter C2 may be triggered to begin counting. Similar to the first counter C1, the second counter C2 may be configured to count clock cycles, clock ticks, clock pulses and/or multiples thereof. The second counter C2 may be configured to continue counting as long as Psys remains greater than or equal to TW2. If Psys decreases to less than TW2, then the second counter C2 may halt counting. Similar to the first counter C1, the second counter C2 may be configured to hold the count value until the count is read by power control logic 216 at which time the count value may be reset to, e.g., zero. Thus, the count associated with second counter C2 may be configured to indicate a duration of a time interval that Psys is greater than or equal to TW2.

In operation, power control logic 216 may be configured to capture the available input power value, Pin. For example, power control logic 216 may capture Pin periodically, intermittently, and/or in response to an event, as described herein. Power control logic 216 may then be configured to determine the critical threshold TC based, at least in part, on Pin. For example, power control logic 216 may be configured to determine whether the value of the Pin has changed, e.g., by comparing a current available input power value to a prior available input power value. In another example, power control logic 216 may be configured to determine the critical threshold TC in response to receiving the available input power value. Continuing with this example, receipt of the available input power value may correspond to a change in available input power. Power control logic 216 may then be configured to determine the critical threshold TC based, at least in part, on the current Pin. The critical threshold TC may be set to a value that is less than a maximum system power consumption for the available input power. In other words, TC may be set with a margin so that the asserted processor critical throttle signal is provided to processor 120 before system power consumption reaches the maximum. In this manner, sensing variation due to, e.g., noise, may be accommodated and a system failure due to excessive power consumption may be avoided.

Power control logic 216 may be further configured to determine the warning thresholds TW1, TW2 based, at least in part, on the critical threshold TC. In other words, the amount of power consumed by device 102, above which the processor 120 should be throttled, is related to the available input power. Since the available input power may change, e.g., due to coupling or decoupling a power source and/or due to variations in battery capacity, the critical threshold TC may be adjusted accordingly. The warning thresholds TW1, TW2 may be related to the critical threshold TC, thus, the warning thresholds may be similarly adjusted when the critical threshold TC is adjusted. The warning thresholds TW1, TW2 are less than the critical threshold TC. For example, the warning thresholds TW1, TW2 may be scaled proportional to a change in the value of the critical threshold TC.

Power control logic 216 may be configured to monitor the counters C1, C2 over time. If one or more of the counters C1 and/or C2 remains at zero for a time period greater than a predefined duration, then power control logic 216 may be configured to decrease one or more of the warning thresholds TW1 and/or TW2. In other words, the maximum system power consumption may be less than the warning thresholds. Power control logic 216 may thus be configured to reduce the warning thresholds TW1 and/or TW2, in response. Conversely, if one or more of the counters C1 and/or C2 counts continuously for a time period greater than a predefined duration, then power control logic 216 may be configured to increase one or more of the warning thresholds TW1 and/or TW2. In other words, the minimum system power consumption may be greater than the warning thresholds. Power control logic 216 may then be configured to increase the warning thresholds TW1 and/or TW2, in response.

Power control logic 216 may be configured to utilize counter C1, C2 data (i.e., history) to determine (i.e., to learn) a target processor state associated with the processor 120. The target processor state corresponds to a processor power consumption for the processor 120 immediately following exiting the processor throttled state. The target processor state may correspond to a processor power consumption that is less than a maximum processor power consumption. The target processor state may be utilized to avoid and/or reduce the likelihood that the processor oscillates between throttled and not throttled. For example, power control logic 216 may be configured to identify power consumers, e.g., elements of device 102, and/or related activities that are associated with relatively high counter values. In other words, relatively high counter values may correspond to relatively high system power consumption.

Power control logic 216 may then be configured to provide one or more power consumer identifiers and/or related activity identifiers to processor VR module 204 related to the relatively high power consumers. Processor VR module 204 may then be configured to provide the power consumption information to processor 120 via, e.g., serial communication bus 146. Power control logic 216 may be further configured to provide a target processor state and/or target processor power consumption level to the processor VR module 204. Processor 120 and/or processor VR module 204 may then be configured to determine whether the identified power consumer is performing the related activity. For example, whether the identified power consumer is performing the related activity may be determined in response to the system power consumption value, Psys, decreasing to below the critical threshold TC. If the identified power consumer is performing the related activity, then the processor 120 may be configured to exit the throttled state into the target processor state. If the identified power consumer is not performing the related activity, then the processor may be configured to exit the throttled state into an unconstrained, e.g., maximum processor power available, state. In this manner, an increase in Psys to greater than or equal to the critical threshold TC in response to the processor exiting the throttled state may be avoided. Thus, power control logic 216 may be configured to learn system power consumption related operating characteristics of device 102 based, at least in part, on the warning thresholds and associated counter values, captured over time. The plurality of counters C1 and C2 and associated warning threshold values TW1, TW2 may facilitate statistical analyses and/or characterizing operating statistics associated with system power consumption.

Thus, power control module 202 is configured to capture an available input power value, Pin, and a system power consumption value, Psys, and to determine the critical threshold TC and the warning thresholds TW1, TW2. Power control module 202 is further configured to assert a processor critical throttle signal to the processor 120 if Psys increases to greater than or equal to the critical threshold TC and to determine a target processor state when exiting the throttled state. Thus, processor power consumption may be managed to reduce peak system power consumption and a capacity of a battery, a power supply and/or an alternative power source may be reduced.

Figure 3:
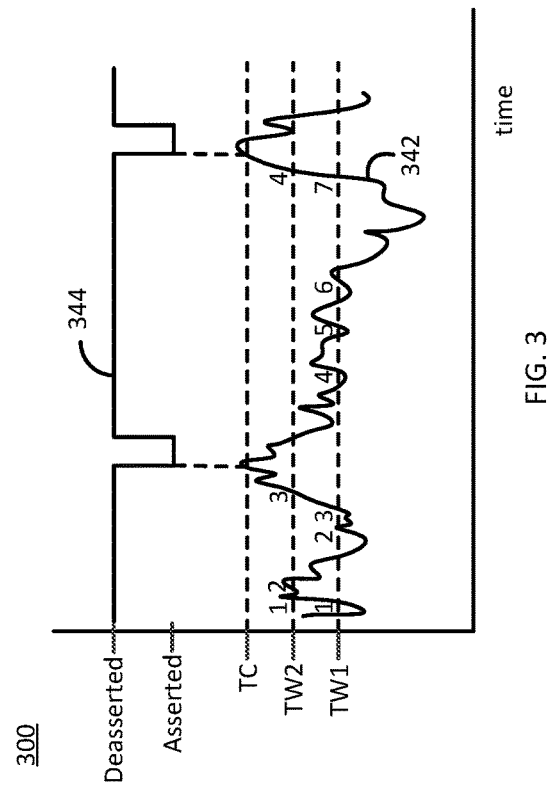
FIG. 3 illustrates plots of example system power consumption, example power consumption thresholds and an example processor critical throttle signal.

FIG. 3 illustrates plots of example system power consumption value (Psys) 342, example power consumption thresholds TC, TW1, TW2 and an example processor critical throttle signal 344. The horizontal axis corresponds to time and the vertical axis corresponds to both system power consumption value and processor critical throttle signal, e.g., voltages. In this example, Psys 342 varies over time, increases to above critical threshold TC twice, increases to above the second warning threshold TW2 four times and increases to above the first warning threshold TW1 seven times. In this example, the processor critical throttle signal 344 is active low, i.e., asserted low and deasserted high. In other words, the processor critical throttle signal 344 is asserted twice, in response to Psys increasing to greater than or equal to the critical threshold TC.

Figure 4:
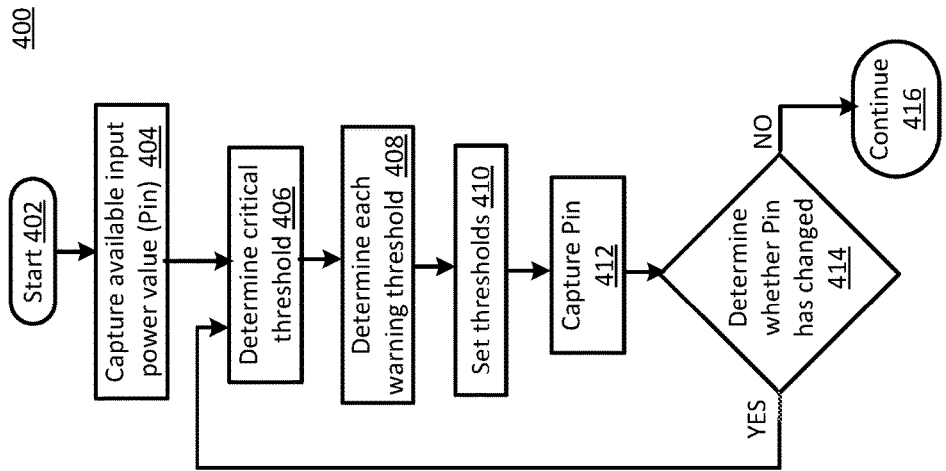
FIG. 4 is a flowchart of threshold related operations according to various embodiments of the present disclosure.

FIG. 4 is a flowchart 400 of threshold related operations according to various embodiments of the present disclosure. In particular, the flowchart 400 illustrates determining and setting a critical threshold TC and one or more warning thresholds, e.g., first warning threshold TW1 and/or second warning threshold TW2, based, at least in part, on an available input power. The operations may be performed, for example, by power control module 140 of FIG. 1 and/or power control module 202 of FIG. 2.

Operations of this embodiment may begin with start 402. Operation 404 includes capturing an available input power value (Pin). For example, Pin may be captured from a power detection module, e.g., power detection module 134 of FIG. 1. Operation 406 may include determining a critical threshold TC. For example, the critical threshold may be determined based, at least in part, on Pin. Each warning threshold, e.g., a first warning threshold TW1 and/or a second warning threshold TW2, may be determined at operation 408. For example, the warning thresholds TW1, TW2 may be determined based, at least in part, on the critical threshold TC. The thresholds may be set at operation 410. For example, each threshold TC, TW1, TW2 may be provided as input to a respective comparator.

Pin may again be captured at operation 412. Whether Pin has changed may be determined at operation 414. For example, a current Pin may be compared to a prior Pin. If Pin has changed, then program flow may proceed to operation 406. If Pin has not changed, then program flow may continue at operation 416.

Thus, a critical threshold TC and one or more warning thresholds, e.g., first warning threshold TW1 and/or second warning threshold TW2, may be determined and set based, at least in part, on an available input power value, Pin.

Figure 5:
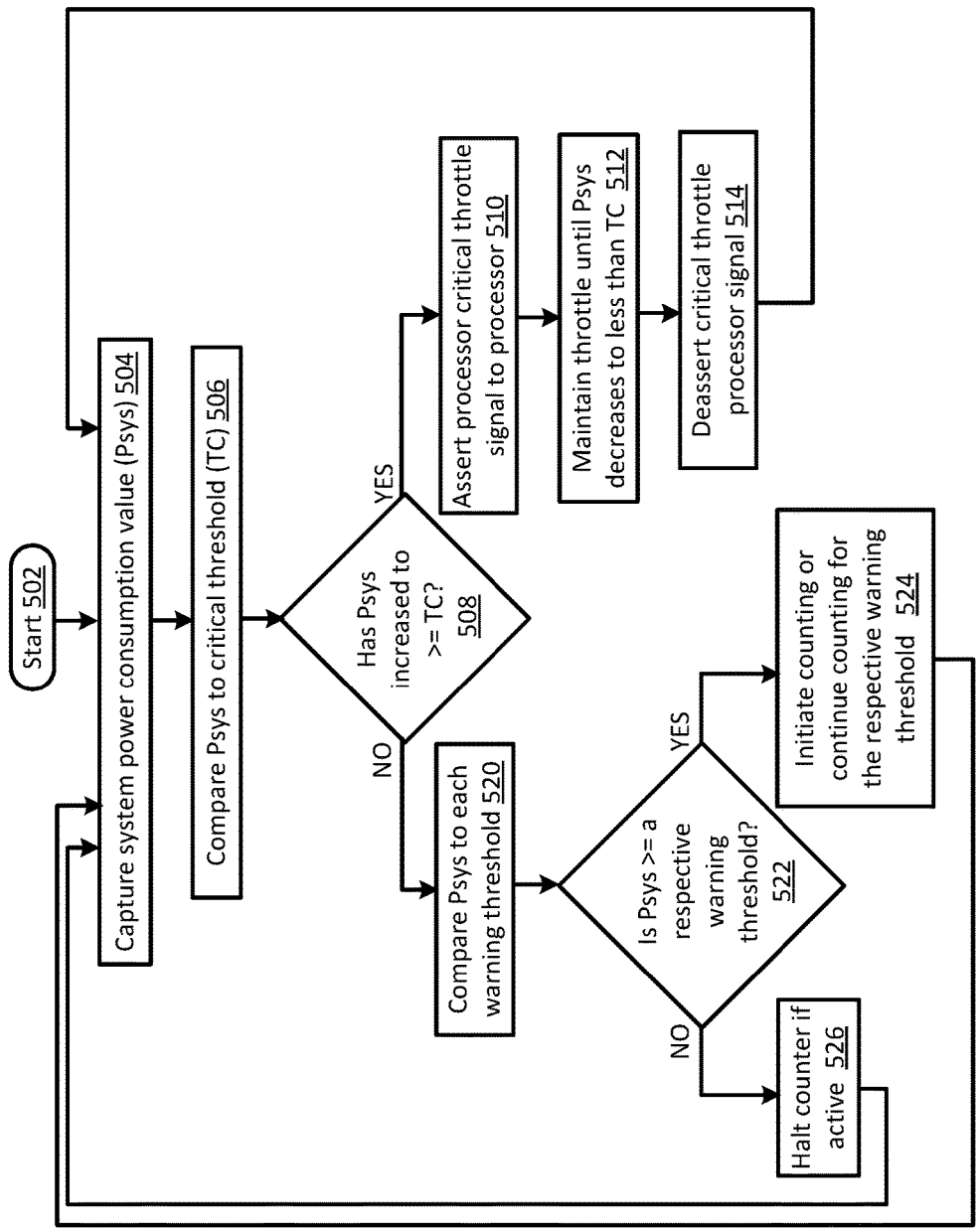
FIG. 5 is a flowchart of system power management operations according to various embodiments of the present disclosure.

FIG. 5 is a flowchart 500 of system power management operations according to various embodiments of the present disclosure. In particular, the flowchart 500 illustrates adjusting processor power consumption based, at least in part, on system power consumption and based, at least in part, on one or more thresholds. The operations may be performed, for example, by power control module 140 of FIG. 1 and/or power control module 202 of FIG. 2.

Operations of this embodiment may begin with start 502. A system power consumption value (Psys) may be captured at operation 504. Psys may be compared to a critical threshold (TC) at operation 506. Whether Psys has increased to greater than or equal to TC may be determined at operation 508. If Psys has increased to greater than or equal to TC, then the processor critical throttle signal may be asserted to the processor at operation 510. Operation 512 includes maintaining the processor throttled, i.e., maintaining the processor critical throttle signal asserted, until Psys decreases to less than TC. The processor critical throttle signal may be deasserted at operation 514. Program flow may then proceed to operation 504.

If Psys has not increased to greater than or equal to TC, then Psys may be compared to each warning threshold at operation 520. Whether Psys is greater than or equal to a respective warning threshold may be determined at operation 522. If Psys is greater than the respective warning threshold, then counting may be initiated or may continue for the respective warning threshold at operation 524. Program flow may then proceed to operation 504. If Psys is not greater than or equal to the respective warning threshold, then the corresponding counter may be halted, if active, at operation 526. Program flow may then proceed to operation 504.

Thus, processor power consumption may be adjusted based, at least in part, on system power consumption and based, at least in part, on one or more thresholds.

While the flowcharts of FIGS. 4 and 5 illustrate operations according various embodiments, it is to be understood that not all of the operations depicted in FIGS. 4 and 5 are necessary for other embodiments. In addition, it is fully contemplated herein that in other embodiments of the present disclosure, the operations depicted in FIGS. 4 and/or 5 and/or other operations described herein may be combined in a manner not specifically shown in any of the drawings, and such embodiments may include less or more operations than are illustrated in FIGS. 4 and 5. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

As in any embodiment herein, the term "module" may include logic and/or circuitry, as described herein.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS), e.g., OS 160, may be configured to manage system resources and control tasks that are run on, e.g., device 102. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement a protocol stack. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Alternative power source 106 may comply and/or be compatible with one or more alternative power source specifications. For example, alternative power source 106 may comply and/or be compatible with one or more Universal serial bus (USB) power delivery specifications, e.g., a USB power delivery specification included in USB 3.1 Specification, released on Jul. 26, 2013, and/or earlier and/or later and/or related versions of this specification. In another example, alternative power source 106 may comply and/or be compatible with a wireless (e.g., inductive) charging protocol, e.g., Qi® System Description Wireless Power Transfer, Volume I: Low Power, Part 1: Interface Definition, Version 1.1.2, released June 2013, by the Wireless Power Consortium, and/or earlier and/or later and/or related versions of this specification. In another example, alternative power source 106 may comply and/or be compatible with the Thunderbolt™, USB related interconnect specification, managed by Intel®, of Santa Clara, Calif.

Device 102, e.g., Comm 130, may comply and/or be compatible with one or more communication specifications, standards and/or protocols.

For example, device 102, e.g., Comm 130, may comply and/or be compatible with IEEE Std 802.11™-2012 standard titled: IEEE Standard for Information technology—Telecommunications and information exchange between systems—Local and metropolitan area networks—Specific requirements Part 11: Wireless LAN Medium Access Control (MAC) and Physical Layer (PHY) Specifications, published in March 2012 and/or earlier and/or later and/or related versions of this standard, including, for example, IEEE Std 802.11ac™-2013, titled IEEE Standard for Information technology-Telecommunications and information exchange between systems, Local and metropolitan area networks-Specific requirements, Part 11: Wireless LAN Medium Access Control (MAC) and Physical Layer (PHY) Specifications; Amendment 4: Enhancements for Very High Throughput for Operation in Bands below 6 GHz, published by the IEEE, December 2013.

Device 102, e.g., Comm 130, may comply and/or be compatible with one or more third generation (3G) telecommunication standards, recommendations and/or protocols that may comply and/or be compatible with International Telecommunication Union (ITU) Improved Mobile Telephone Communications (IMT)-2000 family of standards released beginning in 1992, and/or later and/or related releases of these standards. For example, device 10, e.g., Comm 130,2 may comply and/or be compatible with one or more CDMA (Code Division Multiple Access) 2000 standard(s) and/or later and/or related versions of these standards including, for example, CDMA2000 1×RTT, 1× Advanced and/or CDMA2000 1×EV-DO (Evolution-Data Optimized): Release 0, Revision A, Revision B, Ultra Mobile Broadband (UMB). In another example, device 102, e.g., Comm 130, may comply and/or be compatible with UMTS (Universal Mobile Telecommunication System) standard and/or later and/or related versions of these standards.

Device 102, e.g., Comm 130, may comply and/or be compatible with one or more fourth generation (4G) telecommunication standards, recommendations and/or protocols that may comply and/or be compatible with ITU IMT-Advanced family of standards released beginning in March 2008, and/or later and/or related releases of these standards. For example, device 102, e.g., Comm 130, may comply and/or be compatible with IEEE standard: IEEE Std 802.16™-2012, title: IEEE Standard for Air Interface for Broadband Wireless Access Systems, released August 2012, and/or related and/or later versions of this standard. In another example, device 102, e.g., Comm 130, may comply and/or be compatible with Long Term Evolution (LTE), Release 8, released March 2011, by the Third Generation Partnership Project (3GPP) and/or later and/or related versions of these standards, specifications and releases, for example, LTE-Advanced, Release 10, released April 2011.

Communication links 146, 148 and/or 150 may comply and/or be compatible with one or more serial communication protocol(s).

For example, communication links 146, 148 and/or 150 may be configured to comply and/or be compatible with one or more serial peripheral interface (SPI) standard(s) and/or protocol(s). SPI is a synchronous serial communication interface typically used for short distance communication.

In another example, communication links 146, 148 and/or 150 may comply and/or be compatible with I2C-bus specification Version 2.1, published in 2000, and maintained by NXP Semiconductors, Inc., and/or later and/or related versions of this specification, for example, document UM10204, I2C-bus specification and user manual, Rev. 6, published April 2014.

In another example, communication links 146, 148 and/or 150 may comply and/or be compatible with System Management Bus (SMBus) Specification, Version 2.0, published by the System Management Interface Forum, Inc., August 2000 and/or Version 3.0, published December 2014, and/or later and/or related versions of this specification.

Memory 124 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 180™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

Thus, an apparatus, method and/or system may be configured to capture an available input power value, Pin, and a system power consumption value, Psys, and to determine the critical threshold TC and one or more warning thresholds TW1, TW2. The apparatus, method and/or system may be further configured to assert a processor critical throttle signal to the processor if Psys increases to greater than or equal to the critical threshold TC and to determine a target processor state when exiting the throttled state. Thus, processor power consumption may be managed to reduce peak system power consumption and a capacity of a battery, a power supply and/or an alternative power source may be reduced.

EXAMPLES

Examples of the present disclosure include subject material such as a method, means for performing acts of the method, a device, or of an apparatus or system related to system power management, as discussed below.

Example 1

According to this example, there is provided an apparatus. The apparatus includes power control logic and a critical comparator. The power control logic is to determine a critical threshold (TC) based, at least in part, on an available input power value (Pin). The critical comparator is to compare a system power consumption value (Psys) and the critical threshold. The critical comparator is to assert a processor critical throttle signal to a processor if the system power consumption value is greater than or equal to the critical threshold.

Example 2

This example includes the elements of example 1, wherein the processor critical throttle signal is asserted within one microsecond of the system power consumption value increasing to greater than or equal to the critical threshold from less than the critical threshold.

Example 3

This example includes the elements of example 1, further including a first warning comparator and a first counter, the power control logic to set a first warning threshold and to provide the first warning threshold to the first warning comparator, the first warning threshold related to the critical threshold.

Example 4

This example includes the elements of example 3, wherein the first warning comparator is to compare the system power consumption value and the first warning threshold and the first counter is to at least one of initiate counting and/or continue counting if the system power consumption value is greater than or equal to the first warning threshold.

Example 5

This example includes the elements according to any one of examples 1 to 3, wherein the power control logic is further to adjust the critical threshold in response to a change in the available input power value.

Example 6

This example includes the elements of example 5, wherein the power control logic is further to adjust at least one of the first warning threshold and/or a second warning threshold in response to a change in the critical threshold.

Example 7

This example includes the elements according to any one of examples 1 to 3, wherein the power control logic is further to determine a target processor state based, at least in part, on a history.

Example 8

This example includes the elements of example 7, wherein the history includes data captured over a time period related to system power consumption.

Example 9

This example includes the elements of example 3, further including a second warning comparator and a second counter, the power control logic to set a second warning threshold and to provide the second warning threshold to the second warning comparator, the second warning threshold related to the critical threshold, the second warning threshold greater than the first warning threshold.

Example 10

This example includes the elements of example 9, wherein the second warning comparator is to compare the system power consumption value and the second warning threshold and the second counter is to at least one of initiate counting and/or continue counting if the system power consumption value is greater than or equal to the second warning threshold.

Example 11

According to this example, there is provided a method. The method includes determining, by power control logic, a critical threshold (TC) based, at least in part, on an available input power value (Pin). The method further includes comparing, by a critical comparator, a system power consumption value (Psys) and the critical threshold. The method further includes asserting, by the critical comparator, a processor critical throttle signal to a processor if the system power consumption value is greater than or equal to the critical threshold.

Example 12

This example includes the elements of example 11, wherein the processor critical throttle signal is asserted within one microsecond of the system power consumption value increasing to greater than or equal to the critical threshold from less than the critical threshold.

Example 13

This example includes the elements of example 11, further including setting, by the power control logic, a first warning threshold; and providing, by the power control logic, the first warning threshold to a first warning comparator, the first warning threshold related to the critical threshold.

Example 14

This example includes the elements of example 13, further including comparing, by the first warning comparator, a system power consumption value and the first warning threshold; and at least one of initiating and/or continuing, by the first counter, counting, if the system power consumption value is greater than or equal to the first warning threshold.

Example 15

This example includes the elements of example 11, further including adjusting, by the power control logic, the critical threshold in response to a change in the available input power value.

Example 16

This example includes the elements of example 15, further including adjusting, by the power control logic, at least one of a first warning threshold and/or a second warning threshold in response to a change in the critical threshold.

Example 17

This example includes the elements of example 11, further including determining, by the power control logic, the target processor state based, at least in part, on a history.

Example 18

This example includes the elements of example 17, wherein the history includes data captured over a time period related to system power consumption.

Example 19

This example includes the elements of example 11, further including setting, by the power control logic, a second warning threshold; and providing, by the power control logic, the second warning threshold to a second warning comparator, the second warning threshold related to the critical threshold, the second warning threshold greater than the first warning threshold.

Example 20

This example includes the elements of example 19, further including comparing, by the second warning comparator, a system power consumption value and the second warning threshold; and at least one of initiating and/or continuing, by the second counter, counting, if the system power consumption value is greater than or equal to the second warning threshold.

Example 21

According to this example, there is provided a device. The device includes a processor; a communication interface; a peripheral device; and a power control module. The power control module includes power control logic and a critical comparator. The power control logic is to determine a critical threshold (TC) based, at least in part, on an available input power value (Pin). The critical comparator is to compare a system power consumption value (Psys) and the critical threshold. The critical comparator is further to assert a processor critical throttle signal to a processor if the system power consumption value is greater than or equal to the critical threshold.

Example 22

This example includes the elements of example 21, wherein the processor critical throttle signal is asserted within one microsecond of the system power consumption value increasing to greater than or equal to the critical threshold from less than the critical threshold.

Example 23

This example includes the elements of example 21, wherein the power control module further includes a first warning comparator and a first counter, the power control logic to set a first warning threshold and to provide the first warning threshold to the first warning comparator, the first warning threshold related to the critical threshold.

Example 24

This example includes the elements of example 23, wherein the first warning comparator is to compare the system power consumption value and the first warning threshold and the first counter is to at least one of initiate counting and/or continue counting if the system power consumption value is greater than or equal to the first warning threshold.

Example 25

This example includes the elements according to any one of examples 21 to 23, wherein the power control logic is further to adjust the critical threshold in response to a change in the available input power value.

Example 26

This example includes the elements of example 25, wherein the power control logic is further to adjust at least one of the first warning threshold and/or a second warning threshold in response to a change in the critical threshold.

Example 27

This example includes the elements according to any one of examples 21 to 23, wherein the power control logic is further to determine a target processor state based, at least in part, on a history.

Example 28

This example includes the elements according to any one of examples 21 to 23, further including a battery, the available input power value related to an available capacity of the battery.

Example 29

This example includes the elements according to any one of examples 21 to 23, wherein the system power consumption value is related to operation of one or more of the processor, communication interface and/or the peripheral device.

Example 30

This example includes the elements of example 27, wherein the history includes data captured over a time period related to system power consumption.

Example 31

This example includes the elements according to any one of examples 21 to 23, wherein the power control module further includes a second warning comparator and a second counter, the power control logic to set a second warning threshold and to provide the second warning threshold to the second warning comparator, the second warning threshold related to the critical threshold, the second warning threshold greater than the first warning threshold.

Example 32

This example includes the elements of example 31, wherein the second warning comparator is to compare the system power consumption value and the second warning threshold and the second counter is to at least one of initiate counting and/or continue counting if the system power consumption value is greater than or equal to the second warning threshold.

Example 33

According to this example, there is provided a computer readable storage device. The computer readable storage device has stored thereon instructions that when executed by one or more processors result in the following operations including determining a critical threshold (TC) based, at least in part, on an available input power value (Pin); comparing a system power consumption value (Psys) and the critical threshold; and asserting a processor critical throttle signal to a processor if the system power consumption value is greater than or equal to the critical threshold.

Example 34

This example includes the elements of example 33, wherein the processor critical throttle signal is asserted within one microsecond of the system power consumption value increasing to greater than or equal to the critical threshold from less than the critical threshold.

Example 35

This example includes the elements of example 33, wherein the instructions that when executed by one or more processors results in the following additional operations including setting a first warning threshold; and providing the first warning threshold to a first warning comparator, the first warning threshold related to the critical threshold.

Example 36

This example includes the elements of example 35, wherein the instructions that when executed by one or more processors results in the following additional operations including comparing a system power consumption value and the first warning threshold; and at least one of initiating and/or continuing counting, if the system power consumption value is greater than or equal to the first warning threshold.

Example 37

This example includes the elements according to any one of examples 33 to 35, wherein the instructions that when executed by one or more processors results in the following additional operations including adjusting the critical threshold in response to a change in the available input power value.

Example 38

This example includes the elements of example 37, wherein the instructions that when executed by one or more processors results in the following additional operations including adjusting at least one of a first warning threshold and/or a second warning threshold in response to a change in the critical threshold.

Example 39

This example includes the elements according to any one of examples 33 to 35, wherein the instructions that when executed by one or more processors results in the following additional operations including determining the target processor state based, at least in part, on a history.

Example 40

This example includes the elements of example 39, wherein the history includes data captured over a time period related to system power consumption.

Example 41

This example includes the elements according to any one of examples 33 to 35, wherein the instructions that when executed by one or more processors results in the following additional operations including setting a second warning threshold; and providing the second warning threshold to a second warning comparator, the second warning threshold related to the critical threshold, the second warning threshold greater than the first warning threshold.

Example 42

This example includes the elements of example 41, wherein the instructions that when executed by one or more processors results in the following additional operations including comparing a system power consumption value and the second warning threshold; and at least one of initiating and/or continuing counting, if the system power consumption value is greater than or equal to the second warning threshold.

Example 43

According to this example, there is provided a device. The device includes means for determining, by power control logic, a critical threshold (TC) based, at least in part, on an available input power value (Pin); means for comparing, by a critical comparator, a system power consumption value (Psys) and the critical threshold; and means for asserting, by the critical comparator, a processor critical throttle signal to a processor if the system power consumption value is greater than or equal to the critical threshold.

Example 44

This example includes the elements of example 43, wherein the processor critical throttle signal is asserted within one microsecond of the system power consumption value increasing to greater than or equal to the critical threshold from less than the critical threshold.

Example 45

This example includes the elements of example 43, further including means for setting, by the power control logic, a first warning threshold; and means for providing, by the power control logic, the first warning threshold to a first warning comparator, the first warning threshold related to the critical threshold.

Example 46

This example includes the elements of example 45, further including means for comparing, by the first warning comparator, a system power consumption value and the first warning threshold; and means for at least one of initiating and/or continuing, by the first counter, counting, if the system power consumption value is greater than or equal to the first warning threshold.

Example 47

This example includes the elements according to any one of examples 43 to 45, further including means for adjusting, by the power control logic, the critical threshold in response to a change in the available input power value.

Example 48

This example includes the elements of example 47, further including means for adjusting, by the power control logic, at least one of a first warning threshold and/or a second warning threshold in response to a change in the critical threshold.

Example 49

This example includes the elements according to any one of examples 43 to 45, further including means for determining, by the power control logic, the target processor state based, at least in part, on a history.

Example 50

This example includes the elements of example 49, wherein the history includes data captured over a time period related to system power consumption.

Example 51

This example includes the elements according to any one of examples 43 to 45, further including means for setting, by the power control logic, a second warning threshold; and providing, by the power control logic, the second warning threshold to a second warning comparator, the second warning threshold related to the critical threshold, the second warning threshold greater than the first warning threshold.

Example 52

This example includes the elements of example 51, further including means for comparing, by the second warning comparator, a system power consumption value and the second warning threshold; and means for at least one of initiating and/or continuing, by the second counter, counting, if the system power consumption value is greater than or equal to the second warning threshold.

Example 53

According to this example, there is provided a system. The system includes at least one device arranged to perform the method of any one of examples 11 to 20.

Example 54

According to this example, there is provided a device. The device includes means to perform the method of any one of examples 11 to 20.

Example 55

According to this example, there is provided a computer readable storage device. The computer readable storage device has stored thereon instructions that when executed by one or more processors result in the following operations including: the method according to any one of examples 11 through 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
   power detection circuitry to detect when a power source is coupled to the apparatus, to detect when the power source is decoupled from the apparatus and to identify the power source, wherein to identify the power source includes to receive from the power source data comprising a unique power source identifier that includes a capacity descriptor corresponding to a power capacity of the power source;
   at least a first warning comparator and a first counter;
   power control circuitry to determine a critical threshold (TC) based at least in part on an available input power value (Pin), to set a first warning threshold less than the critical threshold, to provide the first warning threshold to the first warning comparator and to, responsive to a determination that a system power consumption value (Psys) has satisfied the first warning threshold by increasing from less than the first warning threshold to greater than or equal to the first warning threshold, initiate the first counter to begin counting; and
   a critical comparator to compare a system power consumption value (Psys) and the critical threshold, the critical comparator further to assert a processor critical throttle signal to a processor if the system power consumption value is greater than or equal to the critical threshold.

2. The apparatus of claim 1, wherein the critical comparator is to assert the processor critical throttle signal is asserted within one microsecond of the system power consumption value satisfying the critical threshold.

3. The apparatus of claim 1, wherein the first warning comparator is to compare the system power consumption value and the first warning threshold and wherein the first counter is to at least one of initiate counting and/or continue counting if the system power consumption value is greater than or equal to the first warning threshold.

4. The apparatus of claim 1, wherein the power control circuitry is further to adjust the critical threshold in response to a change in the available input power value.

5. The apparatus of claim 4, wherein the power control circuitry is further to adjust at least one of the first warning threshold and/or a second warning threshold in response to a change in the critical threshold.

6. The apparatus of claim 1, wherein the power control circuitry is further to determine a target processor state based at least in part on a history.

7. A method comprising:
   detecting when a power source is coupled to, or decoupled from, an apparatus;
   upon detecting that the power source is coupled to the apparatus, identifying the power source using data received from the power source, the data comprising at least a unique power source identifier including a capacity descriptor corresponding to a power capacity of the power source;
   determining, via power control circuitry, a critical threshold (TC) based at least in part on an available input power value (Pin);
   setting, via the power control circuitry, a first warning threshold less than the critical threshold;
   providing, via the power control circuitry, the first warning threshold to a first warning comparator;
   at least one of initiating and/or continuing, by a first counter, counting responsive to a system power consumption value (Psys) being greater than or equal to the first warning threshold;
   comparing, via a critical comparator, a system power consumption value (Psys) and the critical threshold; and
   asserting, via the critical comparator, a processor critical throttle signal to a processor responsive to the system power consumption value being greater than or equal to the critical threshold.

8. The method of claim 7, wherein asserting the processor critical throttle signal includes asserting the processor critical throttle signal asserted within one microsecond of the system power consumption value increasing to greater than or equal to the critical threshold from less than the critical threshold.

9. The method of claim 7, further comprising adjusting, via the power control circuitry, the critical threshold in response to a change in the available input power value.

10. The method of claim 9, further comprising adjusting, via the power control circuitry, at least one of a first warning threshold and/or a second warning threshold in response to a change in the critical threshold.

11. The method of claim 7, further comprising determining, via the power control circuitry, the target processor state based at least in part on a history.

12. A device comprising:
    a processor;
    a communication interface;
    a peripheral device; and
    a power control module comprising:
      power detection circuitry to detect when a power source is coupled to the apparatus, to detect when the power source is decoupled from the apparatus, and to identify the power source, wherein to identify the power source includes to receive from the power source data comprising a unique power source identifier that includes a capacity descriptor corresponding to a power capacity of the power source;

at least a first warning comparator and a first counter;

power control circuitry to determine a critical threshold (TC) based at least in part on an available input power value (Pin), to set a first warning threshold less than the critical threshold, to provide the first warning threshold to the first warning comparator and to, responsive to a determination that a system power consumption value (Psys) has satisfied the first warning threshold by increasing from less than the first warning threshold to greater than or equal to the first warning threshold, initiate the first counter to begin counting; and a critical comparator to compare a system power consumption value (Psys) and the critical threshold, the critical comparator further to assert a processor critical throttle signal to a processor responsive to the system power consumption value being greater than or equal to the critical threshold.

13. The device of claim 12, wherein the critical comparator is to assert the processor critical throttle signal within one microsecond of the system power consumption value satisfying the critical threshold.

14. The device of claim 12, wherein the first warning comparator is to compare the system power consumption value and the first warning threshold and wherein the first counter is to at least one of initiate counting and/or continue counting if the system power consumption value is greater than or equal to the first warning threshold.

15. The device of claim 12, wherein the power control circuitry is further to adjust the critical threshold in response to a change in the available input power value.

16. The device of claim 15, wherein the power control circuitry is further to adjust at least one of the first warning threshold and/or a second warning threshold in response to a change in the critical threshold.

17. The device of claim 12, wherein the power control circuitry is further to determine a target processor state based at least in part on a history.

18. The device of claim 12, further comprising a battery, wherein the available input power value is related to an available capacity of the battery.

19. The device of claim 12, wherein the system power consumption value is related to operation of one or more of the processor, communication interface and/or the peripheral device.

* * * * *